US00RE39597E

(19) United States
(12) Reissued Patent
Rousseau

(10) Patent Number: US RE39,597 E
(45) Date of Reissued Patent: May 1, 2007

(54) VARIABLE SPEED DRIVE CHILLER SYSTEM

(75) Inventor: William H. Rousseau, Savannah, GA (US)

(73) Assignee: Carrier Corporation, Farmington, CT (US)

(21) Appl. No.: 10/682,850

(22) Filed: Oct. 9, 2003

Related U.S. Patent Documents

Reissue of:
(64) Patent No.: 6,434,960
Issued: Aug. 20, 2002
Appl. No.: 09/895,684
Filed: Jul. 2, 2001

(51) Int. Cl.
*F25B 49/00* (2006.01)
*F25B 27/00* (2006.01)
*F25B 1/00* (2006.01)

(52) U.S. Cl. ..... 62/228.4; 62/236; 62/498; 62/259.2

(58) Field of Classification Search ..... 62/228.4, 62/228.1, 236, 498, 259.2
See application file for complete search history.

(56) References Cited

U.S. PATENT DOCUMENTS

| | | | | |
|---|---|---|---|---|
| 630,848 | A | 8/1899 | Brewer | |
| 960,994 | A | 6/1910 | Motsinger | |
| 1,270,037 | A | 6/1918 | Leonard | |
| 2,410,341 | A | 10/1946 | Delamere | |
| 2,481,527 | A | 9/1949 | Nilsson | |
| 2,652,192 | A | 9/1953 | Chillon | |
| 2,674,089 | A | 4/1954 | Boestad | |
| 2,888,442 | A | 1/1959 | Nilson | |
| 3,355,906 | A * | 12/1967 | Newton | 62/209 |
| 3,410,405 | A | 11/1968 | Marsteller | |
| 3,555,843 | A * | 1/1971 | Cook | 62/196.4 |
| 3,589,139 | A * | 6/1971 | Arthur | 62/115 |
| 3,780,532 | A * | 12/1973 | Norbeck et al. | 62/201 |
| 3,848,987 | A | 11/1974 | Baldwin | |
| 3,966,371 | A | 6/1976 | Berzanske | |
| 4,181,474 | A | 1/1980 | Shaw | |
| 4,242,067 | A | 12/1980 | Segerstrom | |
| 4,371,324 | A | 2/1983 | Gustafsson | |
| 4,478,054 | A | 10/1984 | Shaw | |
| 4,504,203 | A | 3/1985 | Bloemendal | |
| 4,515,540 | A | 5/1985 | Pillis | |

(Continued)

FOREIGN PATENT DOCUMENTS

| | | |
|---|---|---|
| DE | 24 09 554 | 9/1975 |
| DE | 3701586 A1 | 8/1988 |
| EP | 323 834 A2 | 7/1989 |
| EP | 1 111 187 A2 | 6/2001 |
| GB | 476377 | 12/1937 |
| GB | 645055 | 10/1950 |
| GB | 646344 | 11/1950 |
| GB | 648055 | 12/1950 |
| JP | 5399504 | 8/1978 |
| JP | 54100510 | 8/1979 |
| JP | 56121801 | 9/1981 |
| JP | 4203383 | 7/1992 |
| JP | 6056104 | 3/1994 |
| JP | 6151401 | 5/1994 |
| SE | 115 234 | 10/1945 |

*Primary Examiner*—William C. Doerrler
(74) *Attorney, Agent, or Firm*—Carlson, Gaskey & Olds

(57) ABSTRACT

The compressor in a refrigeration system is controlled solely by a variable speed drive which controls the motor of the compressor by virtue of the varying of the frequency of the electricity provided to the motor. To minimize the initial cost and to minimize operating costs, the variable speed drive is cooled by refrigerant from the refrigeration system which permits the use of a smaller drive, and the variable speed drive is operated at, or approaching, a unity power factor.

25 Claims, 1 Drawing Sheet

U.S. PATENT DOCUMENTS 4,623,305 A 11/1986 Segerstrom
4,720,981 A * 1/1988 Helt et al. ..... 62/113
4,776,779 A 10/1988 Crump
4,913,634 A 4/1990 Nagata
5,052,472 A * 10/1991 Takahashi et al. ..... 165/299
5,086,626 A 2/1992 Iida
5,165,881 A 11/1992 Wicen
5,222,874 A 6/1993 Unnewehr
5,224,354 A * 7/1993 Ito et al. ..... 62/210
5,245,836 A 9/1993 Lorentzen et al.
5,246,349 A 9/1993 Hartog
5,255,529 A 10/1993 Powell et al.
5,332,376 A 7/1994 Lindbrandt
5,490,394 A 2/1996 Marques et al.
5,537,830 A * 7/1996 Goshaw et al. ..... 62/201
5,560,218 A * 10/1996 Jang ..... 62/228.4
5,568,732 A 10/1996 Isshiki et al.
5,613,369 A 3/1997 Sato et al.
5,642,992 A 7/1997 Shaw
5,651,260 A * 7/1997 Goto et al. ..... 62/126
5,653,585 A 8/1997 Fresco
5,657,638 A 8/1997 Erdman et al.
5,671,607 A * 9/1997 Clemens et al. ..... 62/228.4
5,694,783 A 12/1997 Bartlett
5,782,101 A 7/1998 Dennis
5,797,276 A 8/1998 Howenstine et al.
5,807,091 A 9/1998 Shaw
5,845,509 A * 12/1998 Shaw et al. ..... 62/175
5,970,729 A * 10/1999 Yamamoto et al. ..... 62/178
6,045,344 A 4/2000 Tsuboi
6,073,457 A 6/2000 Kampf et al.
6,085,532 A * 7/2000 Sibik ..... 62/179
6,116,040 A * 9/2000 Stark ..... 62/259.2
6,217,304 B1 4/2001 Shaw
6,397,610 B1 6/2002 Weng et al.
6,415,617 B1 7/2002 Seem
6,560,980 B2 5/2003 Gustafson et al.
6,694,763 B2 2/2004 Howard
6,968,708 B2 11/2005 Gopalnarayanan et al.

* cited by examiner

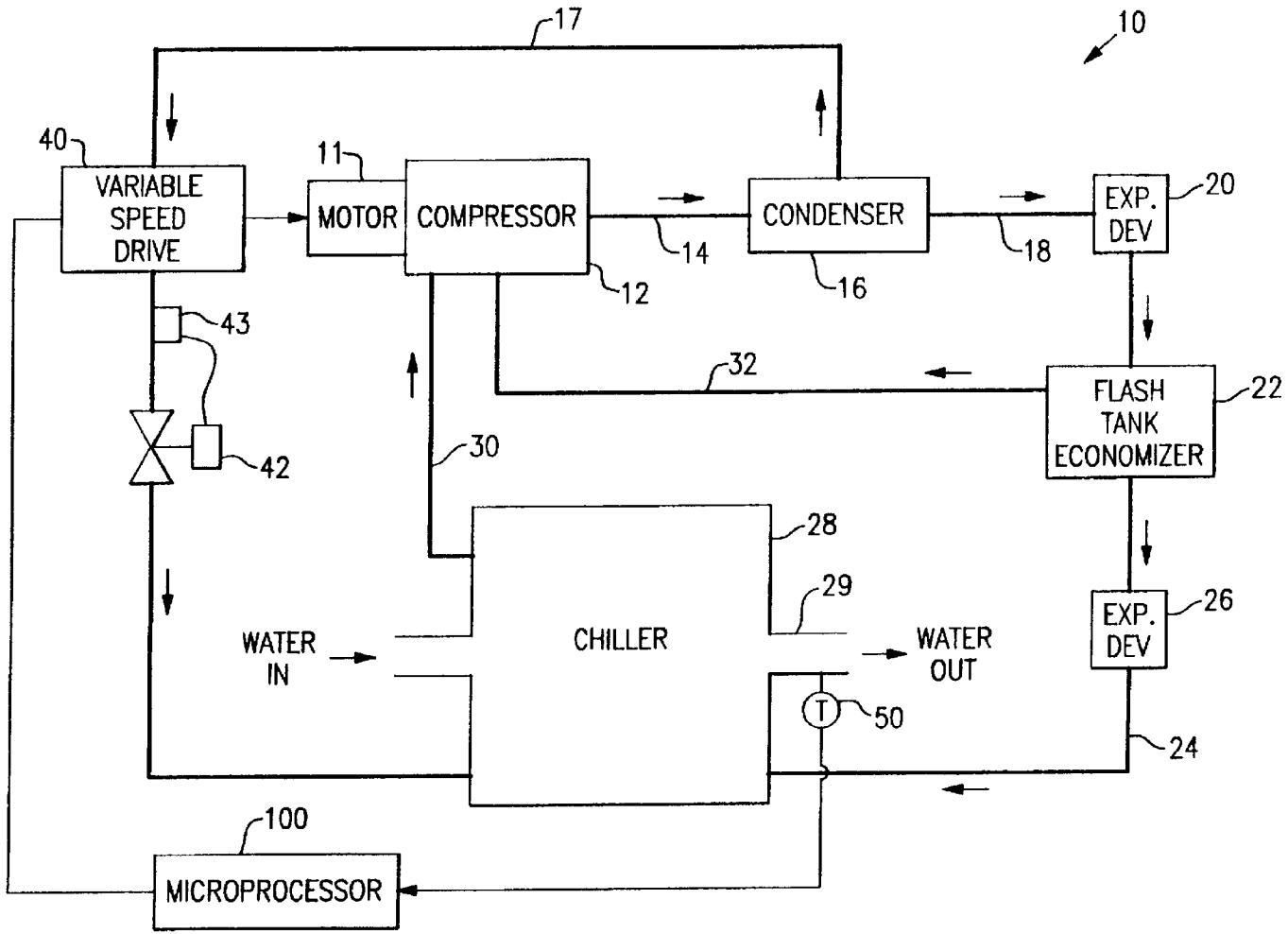
10
EXP. DEV
20
FLASH TANK ECONOMIZER
22
EXP. DEV
26
24
18
CONDENSER
16
WATER OUT
50
T
28
29
32
14
12
CHILLER
17
COMPRESSOR
30
MOTOR
11
WATER IN
42
43
VARIABLE SPEED DRIVE
40
MICROPROCESSOR
100

VARIABLE SPEED DRIVE CHILLER SYSTEM

Matter enclosed in heavy brackets [ ] appears in the original patent but forms no part of this reissue specification; matter printed in italics indicates the additions made by reissue.

*A second reissue application, 11/397,888, for U.S. Pat. No. 6,434,960, has been filed on Apr. 4, 2006.*

BACKGROUND OF THE INVENTION

In screw compressors the bores for the rotors overlap. The overlapping bores create cusps in the nature of the waist of a figure eight. One of the cusps in the normal lactation for one form of a mechanical unloader which forms a portion of the bore and coacts with the rotors as it moves axially in the cusp to unload and to control the $V_1$ or discharge volume to suction volume ratio, of the compressor. The unloader is normally driven by a solenoid. To provide a greater degree of control, it is common to provide a variable speed drive which controls the motor by changing the frequency of the electric power being supplied to the motor by the variable speed drive.

SUMMARY OF THE INVENTION

The cost of a variable speed drive is on the order of that of a compressor. So, adding a variable speed drive to a conventional compressor greatly increases the cost and adds a degree of redundancy since the unloader valve, or other mechanical unloading structure, has some functional overlap with the variable speed drive in that both can control compressor capacity. While the variable speed drive is external to the compressor, an unloader valve is internal to the compressor. Being internal to the compressor, the unloader valve requires additional manufacturing steps to accommodate it in the compressor. Specifically, the unloader valve is located in a cusp and effectively forms a portion of the bores. This requires precision machining to achieve the requisite sealing with the rotors and introduces a leakage path along the interface of the unloader valve with the rotor bores. Other types of mechanical unloaders such as poppets also require additional manufacturing steps in order to be accommodated in a compressor.

The present invention eliminates the mechanical unloader structure and thereby simplifies the manufacture of the compressor while reducing costs. All of the control of the compressor is through the variable speed drive so that further efficiency increases and cost reductions can be achieved by properly selecting the variable speed drive, motor, compressor and chiller for a particular application. The required drive amperage of the variable speed drive, and also its cost, is directly related to the chiller performance and to the motor power factor. Improvements in the chiller performance and motor power factor lowers the average cost of a variable speed drive for an application.

In the case of the compressor, considerations for unloading include the amperage or load requirements over the range of operation, efficiency over the range of operation and the minimum speed requirements for bearing life which is dependent upon lubrication circulation with the refrigerant. The motor must be matched with both the variable speed drive and the compressor in order to optimize the speed of the compressor. For example, the ideal compressor speed for a given load is not usually the same as the synchronous speed. Also, the variable speed drive may be required to compensate for the various input frequencies and voltages used around the world and one motor voltage can be used for all applications over a range of supply voltages. For example, one variable speed drive and motor combination might be efficiently used for power supplied at 50 Hz or 60 Hz and over a voltage range of 346 volts to 480 volts since the variable speed drive output would remain the same. The system current usage can be minimized through a unity, or approaching unity, input power factor of the variable speed drive. The variable speed drive output can be increased by using system refrigerant for cooling such as is taught in commonly assigned U.S. Pat. No. 6,116,040. This permits the use of a smaller and therefore less expensive variable speed drive to produce a desired output.

The foregoing factors are optimized to achieve a given performance at a minimized installed cost with the following being affected: the compressor size, speed and configuration; the variable speed drive size, input, output and cooling configuration; the motor size and speed; and the input wire sizes.

It is an object of this invention to control compressor output in a refrigeration system solely by use of a variable speed drive.

It is another object of this invention to reduce the initial cost of a refrigeration system employing a variable speed drive.

It is an additional object of this invention to add a variable speed drive to a refrigeration system at a cost penalty no greater than 5% of the cost of a compressor with mechanical unloading.

It is a further object of this invention to integrate a variable speed drive into a refrigeration system. These objects, and others as will become apparent, hereinafter, are accomplished by the present invention.

Basically, the compressor in a refrigeration system is controlled solely by a variable speed drive which controls the motor of the compressor by virtue of the varying of the frequency of the electric current provided to the motor. To minimize the initial cost and to minimize operating costs, the variable speed drive is cooled by refrigerant from the refrigeration system which permits the use of a smaller drive, and the variable speed drive is operated at, or approaching, a unity power factor.

BRIEF DESCRIPTION OF THE DRAWINGS

For a fuller understanding of the present invention, reference should now be made to the following detailed description thereof taken in conjunction with the accompanying= drawing wherein:

The FIGURE is a schematic representation of a refrigeration system employing the present invention.

DESCRIPTION OF THE PREFERRED EMBODIMENTS

For a refrigeration system a particular system capacity is the starting point in designing the system. A compressor capable of producing the required capacity will be chosen based upon factors such as cost, efficiency and operating speed. The selection of the compressor will be in conjunction with the selection of the motor. Motors are available having power factors in the range of 0.80 to 0.93 and the motor will be selected based upon cost, power factor, efficiency at design compressor speed. Variable speed drives are available which have power factors running from 0.99 to unity. However, the differences between the standard sizes of the variable speed drives are relatively large such that a considerably oversized variable speed drive might be the smallest standard drive available sufficient to meet design requirements. By cooling the variable speed drive with refrigerant from the condenser, it may be operated at higher than its air cooled drive design capacity because of the greater cooling available. For example, a 100 ampere drive that supplies 80 amperes when air cooled could supply from 80 to 100 amperes for driving the compressor when refrigerant cooled.

In the FIGURE, the numeral 10 generally designates a refrigeration system. Refrigeration system 10 has a screw compressor 12 which has no mechanical unloading structure. Refrigeration system 10 includes a closed fluid circuit serially including compressor 12, discharge line 14, condenser 16, line 18 containing expansion device 20 and flash tank economizer 22, line 24 containing expansion device 26, chiller 28 and suction line 30. Line 32 branches from flash tank economizer 22 and provides fluid communication with a trapped volume in compressor 12 at an intermediate pressure.

Compressor 12 is driven by motor 11 under the control of variable speed drive 40 which is connected to the electrical power grid (not illustrated). Variable speed drive 40 controls the alternating frequency of the current supplied to motor 11 thereby controlling the speed of motor 11 and the output of compressor 12. In chiller 28, water is chilled by refrigerant circulating in the closed fluid circuit of refrigeration system 10. The chilled water provides the cooling to the zones. The temperature of the water leaving chiller 28 via line 29 is sensed by thermal sensor 50 and supplied to microprocessor 100. Microprocessor 100 controls variable speed drive 40 and thereby motor 11 and compressor 12 to maintain a desired water temperature for the water leaving chiller 28. Microprocessor 100 can control variable speed drive 40 solely responsive to the temperature sensed by thermal sensor 50 or it may also receive zone inputs from the zones being cooled and regulate the rate of water circulation through the chiller 26, and thereby the amount of available cooling. If desired, microprocessor 100 may also control expansion devices 20 and 26.

While refrigeration system 10, as described above, has many features common with conventional refrigeration systems, there are a number of significant differences. Screw compressor 12 is simpler than conventional refrigeration compressors in that it has no mechanical unloading structure. Accordingly, the rotors only seal with each other and the bores. There is no slide valve which replaces portions of the bores in the region of a cusp with the attendant extra manufacturing costs and potential for leakage between the slide valve and adjacent structure or any other mechanical unloading structure. The output of compressor 12 is controlled through motor 11 whose speed is controlled by variable speed drive 40. The motor 11 is matched to the variable speed drive 40 and compressor 12. There is an ideal compressor speed for the design compressor output. So the motor is chosen to have efficient operation at the ideal compressor speed and to have an optimized power factor. On the input side of the variable speed drive, a near unity power factor reduces energy usage and the cost of the energy because of the reduced energy demand at, or approaching, unity power factor. This is because the power factor of the variable speed drive, not the power factor of the motor, is seen by the utility, since the variable speed drive isolates the motor from the utility.

In the operation of refrigeration system 10, gaseous refrigerant is induced into compressor 12 via suction line 30 and compressed with the resultant hot, high pressure refrigerant gas being supplied via discharge line 14 to condenser 16. In condenser 16, the gaseous refrigerant condenses as it gives up heat due to heat transfer via air, water or brine-cooled heat exchangers (not illustrated). The condensed refrigerant passes from condenser 16 into line 18 and serially passes through expansion device 20 into flash tank economizer 22. A portion of the refrigerant flowing into economizer 22 is diverted into line 32 at an intermediate pressure and passes via line 32 to a trapped volume in compressor 12. The remaining liquid refrigerant in economizer 22 passes through expansion device 26 thereby undergoing a pressure drop and partially flashing as it passes via line 24 into chiller 28. In chiller 28, the remaining liquid refrigerant evaporates due to heat transfer to the water passing through chiller 28 via line 29. The economizer flow into compressor 12 via line 32 increases the capacity of compressor in that it increases the mass of refrigerant gas being compressed.

Microprocessor 100 receives a signal form thermal sensor 50 indicative of the temperature of the water leaving chiller 28 via line 29 to provide cooling to one or more zones (not illustrated). Responsive to the water temperature sensed by sensor 50, the microprocessor 100 sends a signal to variable speed drive 40 to cause it to change the speed of motor 11 to increase or decrease the cooling capacity of compressor 12, as required. Variable speed drive 40 increases or decreases the speed, and therefore the capacity, of compressor 12 by changing the frequency of the current supplied to power motor 11. By having a motor 11 operating at an optimum power factor the electrical usage and demand are minimized and the size of the variable speed drive 40 required is reduced. Additionally, a portion of the liquid refrigerant in condenser 16 is diverted via line 17 to the variable speed drive 40 where the electronic components are cooled and the refrigerant evaporated. The evaporated refrigerant passes from variable speed drive 40 via line 41 to chiller 28. The rate of flow of refrigerant to variable speed drive 40 from condenser 16 is controlled by valve 42 responsive to the temperature of the refrigerant leaving variable speed drive sensed by sensor 43. Because the variable speed drive 40 is cooled by the liquid refrigerant, a still smaller variable speed drive 40 can be used.

Although a preferred embodiment of the present invention has been illustrated and described, other changes will occur to those skilled in the art. For example, the economizer may be omitted and/or zone temperature, water flow rates, the expansion devices can be connected to the microprocessor. It is therefore intended that the present invention is to be limited only by the scope of the appended claims.

What is claimed is:

1. A refrigerant system having:

a closed fluid circuit serially including a screw compressor, a discharge line, a condenser, an expansion device, a chiller and a suction line leading back to said compressor;

water passing through said chiller in a heat exchange relationship and being cooled;

said compressor being unloaded solely by regulating the speed of said compressor;

motor means for driving said compressor;

means for varying the speed of said motor means by controlling the frequency of electrical current supplied to said motor;

means for providing cooling to said means for varying the speed;

means for sensing the temperature of water leaving said chiller;

means for controlling said means for varying the speed responsive to the sensed temperature of water leaving said chiller.

2. The refrigeration system of claim 1 wherein liquid refrigerant from said condenser is supplied by said means for providing cooling to said means for varying the speed of said motor.

3. The refrigeration system of claim 2 wherein liquid refrigerant used to provide cooling to said means for varying the speed is at least partially evaporated and supplied to said chiller.

4. The refrigeration system of claim 1 wherein said means for controlling said means for varying the speed acts solely responsive to the sensed temperature of water leaving side chiller.

5. The refrigeration system of claim 1 wherein said means for varying the speed of said motor has a constant output over a range of frequency and voltage inputs.

6. A refrigeration system having:

a closed fluid circuit serially including a screw compressor, a discharge line, a condenser, a first expansion device, an economizer, a second expansion device, a chiller and a suction line leading back to said compressor;

a branch line connected to said economizer and extending into said compressor;

water passing through said chiller in a heat exchange relationship and being cooled;

said compressor being unloaded solely by regulating the speed of said compressor;

motor means for driving said compressor;

means for varying the speed of said motor means by controlling the frequency of electric current supplied to said motor;

means for providing cooling to said means for varying the speed;

means for sensing the temperature of water leaving said chiller;

means for controlling said means for varying the speed responsive to the sensed temperature of water leaving said chiller.

7. The refrigeration system of claim 6 wherein liquid refrigerant from said condenser is supplied by said means for providing cooling to said means for varying the speed of said motor.

8. The refrigeration system of claim 6 wherein said means for varying the speed of said motor has a constant output over a range of frequency and voltage inputs.

9. A method for selecting the compressor, motor and variable speed drive for refrigeration system comprising the steps of:

for a given design refrigeration requirement, selecting a compressor having a design speed and being capable of providing the necessary refrigerant delivery;

selecting a motor operating at the compressor design speed with a power factor of at least 0.89 when delivering the design amount of refrigerant;

selecting a variable speed drive for controlling said motor by varying the frequency of electric power supplied to said motor such that said variable speed drive operates at an input power factor of at least 0.99 when driving said motor to drive said compressor to deliver the design amount of refrigerant.

10. The method of claim 9 wherein the step of selecting a compressor includes the selection of a compressor without mechanical unloading structure.

11. The refrigeration system of claim 3 wherein said motor means has a power factor of at least 0.89 and said means for varying the speed of said motor means varies the frequency of electric power supplied to said motor means such that said means for varying the speed of said motor means operates at an input power factor of at least 0.99 when driving said motor means.

12. The refrigeration system of claim 4 wherein said motor means has a power factor of at least 0.89 and said means for varying the speed of said motor means varies the frequency of electric power supplied to said motor means such that said means for varying the speed of said motor means operates at an input power factor of at least 0.99 when driving said motor means.

13. The refrigeration system of claim 5 wherein said motor means has a power factor of at least 0.89 and said means for varying the speed of said motor means varies the frequency of electric power supplied to said motor means such that said means for varying the speed of said motor means operates at an input power factor of at least 0.99 when driving said motor means.

14. The refrigeration system of claim 7 wherein said motor means has a power factor of at least 0.89 and said means for varying the speed of said motor means operates at an input power factor of at least 0.99 when driving said motor means.

15. The refrigeration system of claim 8 wherein said motor means has a power factor of at least 0.89 and said means for varying the speed of said motor means operates at an input power factor of at least 0.99 when driving said motor means.

16. The method of claim 10 further including the step of selecting means for cooling said variable speed drive with refrigerant from said refrigeration system.

17. The method of claim 16 further including the steps of:

selecting means for sensing the temperature of water leaving the chiller; and selecting means for controlling the speed of said motor solely responsive to the sensed temperature of the water leaving the chiller.

*18. A refrigeration system having:*

*a closed fluid circuit serially including a compressor, a discharge line, a condenser, an expansion device, a chiller and a suction line leading back to said compressor;*

*water passing through said chiller in a heat exchange relationship and being cooled;*

*said compressor being unloaded solely by regulating the speed of said compressor;*

*motor means for driving said compressor;*

*means for varying the speed of said motor means by controlling the frequency of electrical current supplied to said motor;*

*means for providing cooling to said means for varying the speed;*

*means for sensing the temperature of water leaving said chiller;*

*means for controlling said means for varying the speed responsive to the sensed temperature of water leaving said chiller.*

*19. The refrigeration system of claim 18 wherein liquid refrigerant from said condenser is supplied by said means for providing cooling to said means for varying the speed of said motor.*

*20. The refrigeration system of claim 19 wherein liquid refrigerant used to provide cooling to said means for varying the speed is at least partially evaporated and supplied to said chiller.*

*21. The refrigeration system of claim 18 wherein said means for controlling said means for varying the speed acts solely responsive to the sensed temperature of water leaving said chiller.*

*22. The refrigeration system of claim 18 wherein said means for varying the speed of said motor has a constant output over a range of frequency and voltage inputs.*

*23. A refrigeration system having:*

*a closed fluid circuit serially including a compressor, a discharge line, a condenser, a first expansion device, an economizer, a second expansion device, a chiller and a suction line leading back to said compressor;*

*a branch line connected to said economizer and extending into said compressor;*

*water passing through said chiller in a heat exchange relationship and being cooled;*

*said compressor being unloaded solely by regulating the speed of said compressor;*

*motor means for driving said compressor;*

*means for varying the speed of said motor means by controlling the frequency of electric current supplied to said motor;*

*means for providing cooling to said means for varying the speed;*

*means for sensing the temperature of water leaving said chiller;*

*means for controlling said means for varying the speed responsive to the sensed temperature of water leaving said chiller.*

*24. The refrigeration system of claim 23 wherein liquid refrigerant from said condenser is supplied by said means for providing cooling to said means for varying the speed of said motor.*

*25. The refrigeration system of claim 23 wherein said means for varying the speed of said motor has a constant output over a range of frequency and voltage inputs.*

* * * * *